US012743811B2

(12) United States Patent
Ganlath et al.

(10) Patent No.: US 12,743,811 B2
(45) Date of Patent: Sep. 22, 2026

(54) SYSTEMS AND METHODS FOR EFFICIENT OBJECT TRACKING AS A SERVICE VIA EDGE

(71) Applicant: Toyota Motor Engineering & Manufacturing North America, Inc., Plano, TX (US)

(72) Inventors: Akila C. Ganlath, Agua Dulce, CA (US); Haoxin Wang, Charlotte, NC (US); Nejib Ammar, San Jose, CA (US); Rohit Gupta, Santa Clara, CA (US); Prashant Tiwari, Santa Clara, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 714 days.

(21) Appl. No.: 17/848,743

(22) Filed: Jun. 24, 2022

(65) Prior Publication Data

US 2023/0419540 A1 Dec. 28, 2023

(51) Int. Cl.
*G06T 7/73* (2017.01)
*G06V 10/25* (2022.01)
(Continued)

(52) U.S. Cl.
CPC ................ *G06T 7/74* (2017.01); *G06V 10/25* (2022.01); *G06V 10/449* (2022.01);
(Continued)

(58) Field of Classification Search
CPC .......... G06T 7/74; G06V 10/25; G06V 20/58; G06V 10/761; G06V 10/449; G06V 10/82
See application file for complete search history.

(56) References Cited

U.S. PATENT DOCUMENTS

| | | | | |
|---|---|---|---|---|
| 10,732,261 | B1 * | 8/2020 | Wang | G05D 1/0257 |
| 11,016,491 | B1 * | 5/2021 | Millard | G01C 21/206 |

(Continued)

FOREIGN PATENT DOCUMENTS

| | | | |
|---|---|---|---|
| CN | 112702692 | A | 4/2021 |
| JP | 2019185366 | A | 10/2019 |

(Continued)

OTHER PUBLICATIONS

Communication network architectures for driver assistance systems (https://www.mdpi.com/1424-8220/21/20/6867/htm); Oct. 16, 2021.

(Continued)

*Primary Examiner* — Kevin Ky
(74) *Attorney, Agent, or Firm* — DINSMORE & SHOHL LLP

(57) ABSTRACT

A method includes receiving features associated with an object to be tracked, receiving an estimated location of the object, determining a region of interest with respect to a first connected vehicle that includes the estimated location of the object, transmitting the features and the region of interest to the first connected vehicle, receiving object data associated with the object from the first connected vehicle, the object data comprising a location of the object, and updating an object track associated with the object based on the object data, the object track comprising the location of the object at a plurality of time steps.

6 Claims, 11 Drawing Sheets

(51) Int. Cl.

| | |
|---|---|
| ***G06V 10/44*** | (2022.01) |
| ***G06V 10/74*** | (2022.01) |
| ***G06V 10/82*** | (2022.01) |
| ***G06V 20/58*** | (2022.01) |
| ***H04L 67/12*** | (2022.01) |

(52) U.S. Cl.

CPC ............ *G06V 10/761* (2022.01); *G06V 10/82* (2022.01); *G06V 20/58* (2022.01); *G06T 2207/20084* (2013.01); *G06T 2207/30241* (2013.01); *G06T 2207/30252* (2013.01); *H04L 67/12* (2013.01)

(56) References Cited

U.S. PATENT DOCUMENTS

| | | | | |
|---|---|---|---|---|
| 2018/0211128 | A1* | 7/2018 | Hotson | G01S 13/89 |
| 2018/0211403 | A1* | 7/2018 | Hotson | G06V 10/764 |
| 2020/0005644 | A1 | 1/2020 | Ichimaru et al. | |
| 2020/0242381 | A1* | 7/2020 | Chao | B60W 40/08 |
| 2020/0272143 | A1* | 8/2020 | Scott | B60W 10/06 |
| 2021/0035442 | A1* | 2/2021 | Baig | G08G 1/0116 |
| 2021/0276574 | A1* | 9/2021 | Efrat Sela | B60W 50/0097 |
| 2021/0300359 | A1 | 9/2021 | Mcgill et al. | |
| 2021/0354634 | A1* | 11/2021 | Yoon | G01S 13/867 |
| 2022/0132125 | A1* | 4/2022 | Yao | H04N 19/184 |
| 2023/0282112 | A1* | 9/2023 | James | G08G 1/056 340/436 |

FOREIGN PATENT DOCUMENTS

| | | | |
|---|---|---|---|
| JP | 2020193954 | A | 12/2020 |
| KR | 102281891 | B1 | 12/2011 |
| WO | 2021002223 | A1 | 1/2021 |

OTHER PUBLICATIONS

Yalong Wu, et al., "Edge Computing-Based Mobile Object Tracking in Internet of Things", available at: https://www.sciencedirect.com/science/article/pii/S2667295221000350; Sep. 24, 2021.

Hong Zhang et al., "Object Tracking for a Smart City Using IoT and Edge Computing", available at https://www.mdpi.com/1424-8220/19/9/1987; Mar. 27, 2019.

Brad Scott, "Object Tracking at the Edge", available at https://www.embeddedml.com/post/object-tracking-at-the-edge; Apr. 15, 2021.

* cited by examiner 100
102
104
106
108
110
112

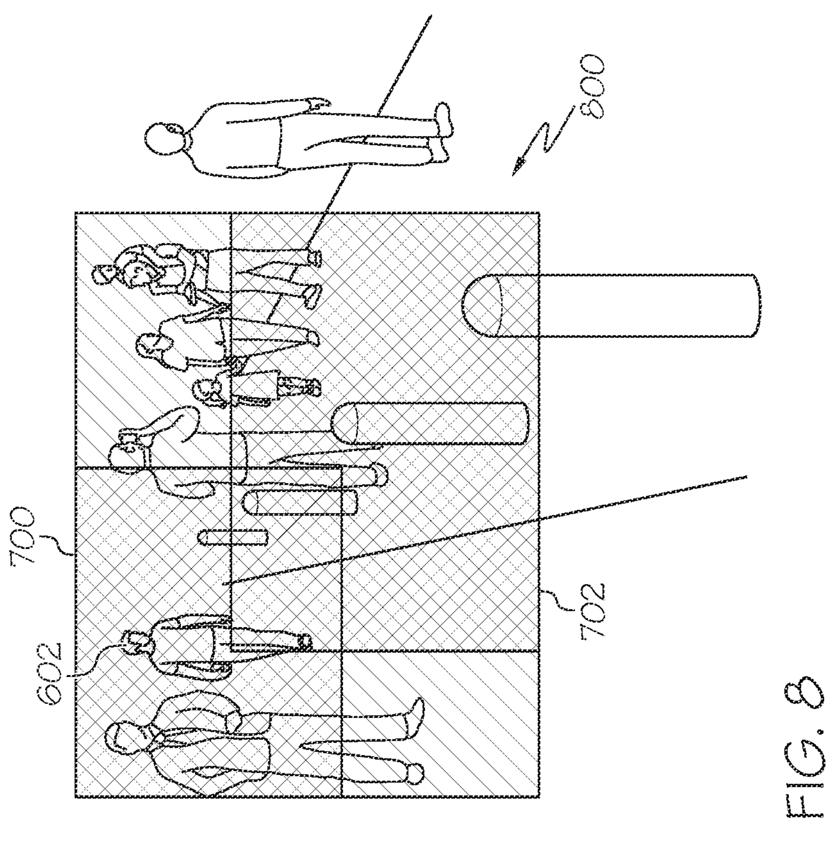
FIG. 8
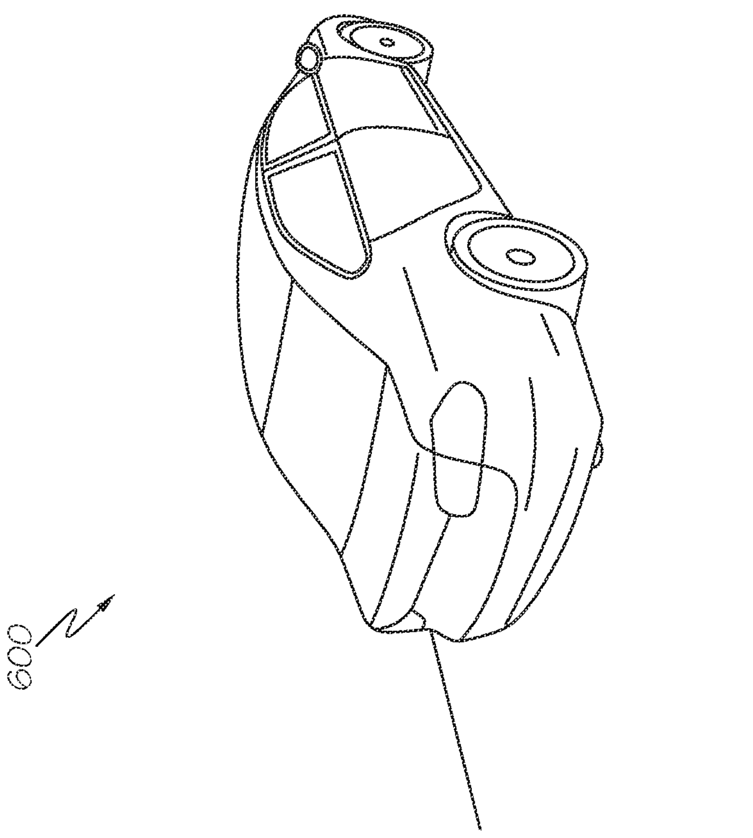

SYSTEMS AND METHODS FOR EFFICIENT OBJECT TRACKING AS A SERVICE VIA EDGE

TECHNICAL FIELD

The present specification relates to object tracking for vehicles, and more particularly, to systems and methods for efficient object tracking as a service via edge.

BACKGROUND

Modern vehicles often have rich perception capabilities due to the incorporation of a diverse array of sensors (e.g., LiDAR, machine vision, RADAR, and the like). Many vehicles also have access to precise localization functionality (e.g., GPS) and access to HD-maps. This functionality may allow for increased autonomous or semi-autonomous driving vehicles.

In addition, many modern vehicles are connected vehicles that can communicate with other vehicles or external devices, such as edge servers or other remote computing devices. This may allow sensor data to be shared between vehicles, which may allow for cooperative object detection and tracking. As such, a system may provide object tracking as a service by utilizing the sensing capabilities of connected vehicles.

SUMMARY

In an embodiment, a method may include receiving features associated with an object to be tracked, receiving an estimated location of the object, determining a region of interest with respect to a first connected vehicle that includes the estimated location of the object, transmitting the features and the region of interest to the first connected vehicle, receiving object data associated with the object from the first connected vehicle, the object data comprising a location of the object, and updating an object track associated with the object based on the object data. The object track may comprise the location of the object at a plurality of time steps.

In another embodiment, a system may include a mobility operator. The mobility operator may receive a request to track an object, receive an estimated location of the object, extract first features associated with the object, select a first edge server among a plurality of edge servers to track the object based on the estimated location of the object and a location of the first edge server, transmit the first features and the estimated location of the object to the first edge server, receive object data from the first edge server, the object data comprising a location of the object, and update an object track associated with the object based on the object data. The object track may comprise the location of the object at a plurality of time steps.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 8 depicts an example region of interest associated with the image of FIG. 6, according to one or more embodiments shown and described herein;

DETAILED DESCRIPTION

The embodiments disclosed herein include systems and methods for efficient object tracking as a service via edge devices. In particular, an object tracking system may allow a customer to specify an object to be tracked. For example, a law enforcement agency may specify a vehicle to be tracked that is the subject of an Amber Alert, or a company may specify one or more vehicles to be tracked for research purposes. A mobility operator of the object tracking system may identify attributes or features of the specified object to be tracked. The mobility operator may then select an edge server to track the object and transmit the features to the selected edge server. One or more connected vehicles within the coverage area of the edge server may collect sensor data, transform the sensor data into features, and determine whether the features match the object attributes. If the detected features match the object features, it may be presumed that the object has been identified by a connected vehicle. The vehicle may then determine local attributes of the object (e.g., position, speed, and trajectory) and transmit these local attributes to the edge server.

When the edge server receives object data from a connected vehicle, it may update a track of the object comprising the object's location history. The edge server may also estimate a future positions of the object based on the received data. As the object moves out of the field of view of one vehicle, the edge server may identify a second connected vehicle whose field of view the object is expected to move into. The edge server may then request that the second connected vehicle track the object using its vehicle sensors. Furthermore, the edge server may specify a particular region of interest within the field of view of the second vehicle's sensors in which the object is expected to be located. The vehicle may then perform image processing only on the specified region of interest.

By specifying a particular region of interest for connected vehicles to focus on, the computing resources needed to be utilized by the connected vehicles may be reduced. By utilizing the exiting image processing capabilities of the connected vehicles, the computing resources used by the edge server may be reduced. Furthermore, by only transmitting object attributes from the connected vehicles to the edge server, rather than raw sensor data, the bandwidth required for data transmission may be reduced. Accordingly, embodiments of the present disclosure comprise efficient object tracking as a service via edge.

Figure 1:
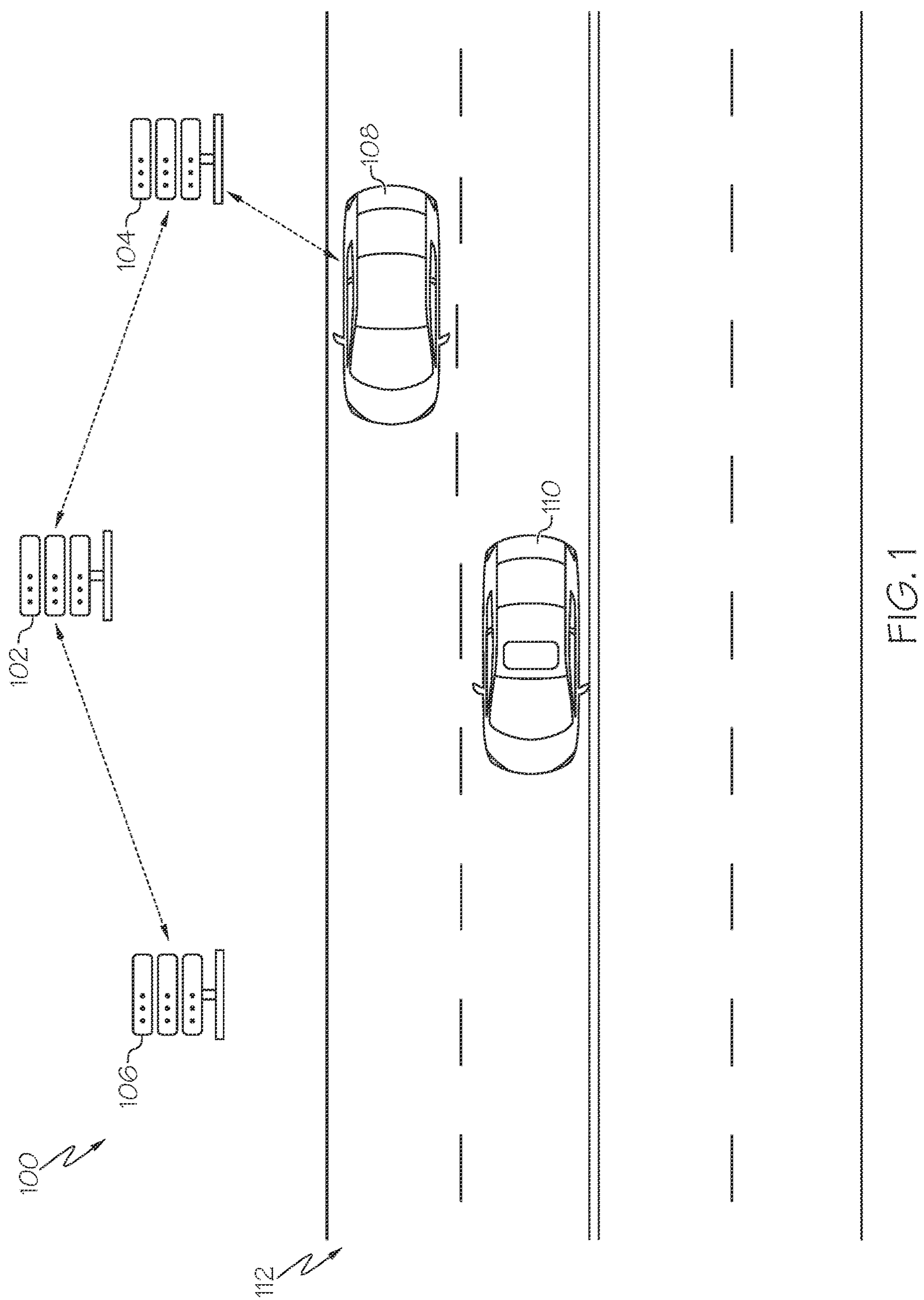
FIG. 1 depicts an example object tracking system, according to one or more embodiments shown and described herein.

FIG. 1 depicts an example object tracking system 100 to illustrate the features of the disclosed technology. The object tracking system 100 of FIG. 1 includes a mobility operator 102, edge servers 104 and 106, a connected vehicle 108 and an object 110 to be tracked. In the example of FIG. 1, the object 110 is a vehicle. However, in other examples, an object to be tracked may be any other type of mobile object (e.g., pedestrians, animals, bicycles, drones, and the like). In the example of FIG. 1, the connected vehicle 108 and the object 110 are driving along a road 112.

The mobility operator 102 may be a computing device that oversees operation of the object tracking system 100, as disclosed herein. In some examples, the mobility operator 102 may comprise a cloud computing device. In other examples, the mobility operator 102 may comprise any other type of computing device.

The mobility operator 102 may receive requests to track objects from customers of the object tracking system 100 (e.g., a customer may desire to track the vehicle 110). Customers of the object tracking system 100 may include law enforcement agencies, government entities, commercial entities, individuals, and the like. A customer may request one or more objects to be tracked by the object tracking system 100, such as vehicles, people, bicycles, other types of mobility devices, and the like. A specified object may then be tracked by the object tracking system 100 using the techniques described herein.

The mobility operator 102 may be communicatively coupled to the edge servers 104, 106. In particular, the mobility operator 102 may transmit data to, and receive data from, the edge servers 104, 106. The mobility operator 102 is discussed further below in connection with FIG. 4.

The edge servers 104, 106 may be communicatively coupled to the mobility operator 102. The edge servers 104, 106 may also be communicatively coupled to one or more connected vehicles. In the example of FIG. 1, the edge server 104 is communicatively coupled to the vehicle 108. However, it should be understood that in other examples, the edge servers 104, 106 may be communicatively coupled to any number of connected vehicles. Furthermore, while the example of FIG. 1 shows two edge servers, it should be understood that in other examples, the object tracking system 100 may comprise any number of edge servers.

In some examples, one or more of the edge servers 104, 106 may be a cloud computing device. In some examples, one or more of the edge servers 104, 106 may be a fixed edge server, e.g., a road-side unit (RSU). In some examples, one or more of the edge servers 104, 106 may be a moving edge server, e.g., another vehicle. In the illustrated example, the edge servers 104, 106 are positioned near the road 112 such that they can be communicatively coupled to connected vehicles driving along the road 112 (e.g., the vehicle 108). Each of the edge servers 104, 106 may provide coverage for a particular coverage area encompassing the road 112 and/or other geographic areas. Other edge servers (not shown) may be spaced along the road 112 and/or other geographic areas such that each edge server may provide coverage for a different coverage area. Thus, as the vehicle 108 drives along the road 112 or other roads, the vehicle 108 may move between different coverage areas covered by different edge servers at different times and may be communicatively connect to different edge servers as it drives out of range of one edge server and within range of another edge server. The edge servers 104, 106 are discussed in greater detail below in connection with FIG. 5.

The vehicle 108 is a connected vehicle that may be communicatively coupled to one or more edge servers. In the example of FIG. 1, the vehicle 108 is within range of the edge server 104 and is communicatively coupled to the edge server 104. However, as the vehicle 108 moves within range of other edge servers (e.g., the edge server 106), the vehicle 108 may become communicatively coupled to other edge servers.

In the example of FIG. 1, only one connected vehicle is shown. However, it should be understood that in other examples, the object tracking system 100 may include any number of connected vehicles. In the illustrated example, the connected vehicles of the object tracking system 100 are vehicles whose owners have volunteered to have their vehicles used to track objects as part of the object tracking system 100. As such, as the owners of the connected vehicles drive the vehicles in their ordinary course, the sensors and computing resources of the vehicles may be utilized by the object tracking system 100, as disclosed herein. In some examples, the owners of the vehicles used as part of the object tracking system 100 may receive monetary or other forms of compensation in exchange for their participation in the object tracking system 100. In other examples, the connected vehicles that are part of the object tracking system 100 may comprise a fleet of vehicles used specifically for object tracking purposes.

Figure 2:
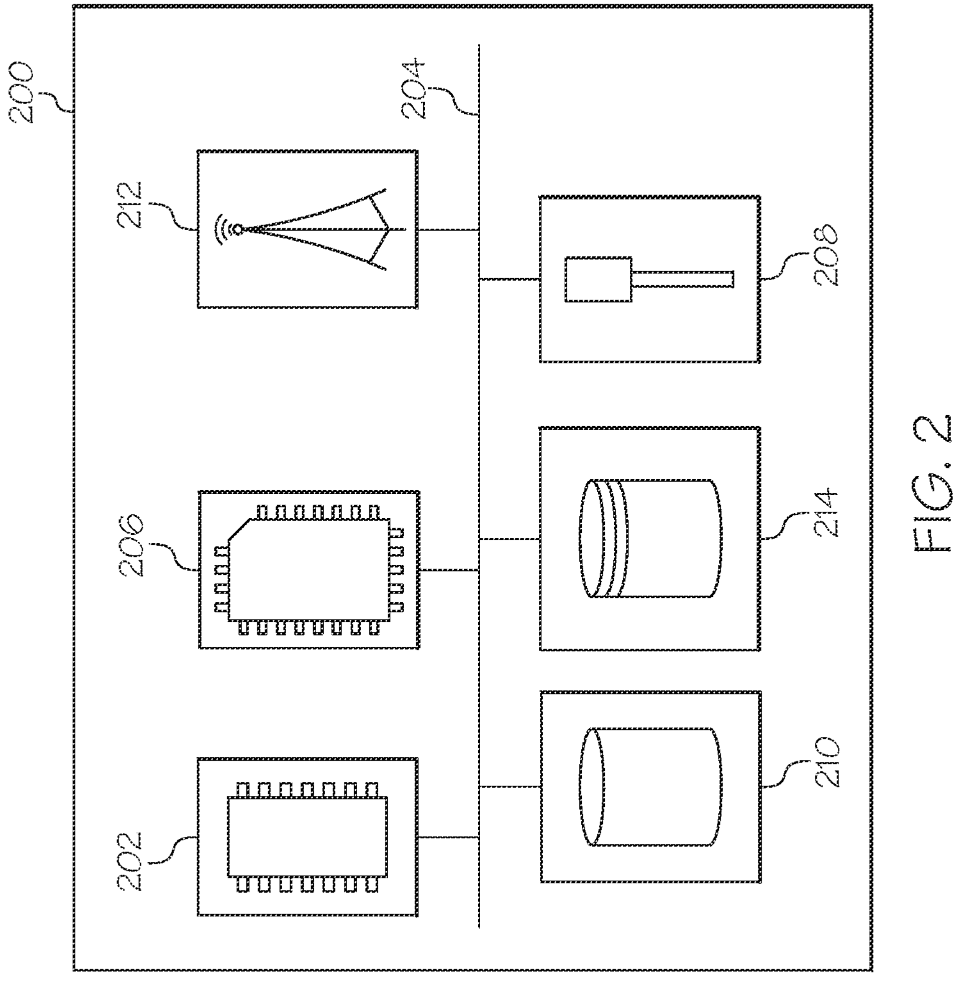
FIG. 2 depicts a schematic diagram of a vehicle system, according to one or more embodiments shown and described herein.

FIG. 2 depicts a vehicle system 200 that may be included in the vehicle 108 of FIG. 1. The vehicle system 200 includes one or more processors 202, a communication path 204, one or more memory modules 206, a satellite antenna 208, one or more vehicle sensors 210, network interface hardware 212, a local database 214, and an electronic control unit (ECU) 216. In some examples, the vehicle system 200 may also include one or more modules for performing autonomous driving of the vehicle 108. However, in other examples, the vehicle 108 may be a manually driven vehicle. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as anode that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 are discussed in further detail below with respect to FIG. 3.

The vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208. As such, the vehicle system 200 may utilize the satellite antenna 208 to determine the location of the vehicle 108.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., RGB cameras, depth cameras, laser sensors, proximity sensors, location sensors (e.g., GPS modules)), and the like. The vehicle sensors 210 may monitor the surroundings of the vehicle 108 and the data gathered by the vehicle sensors 210 may be used to identify and track a specified object (e.g., the vehicle 110), as disclosed herein.

The vehicle system 200 comprises network interface hardware 212 for communicatively coupling the vehicle system 200 to the edge server 104, or other edge servers. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol.

The vehicle system 200 comprises a local database 214. The local database 214 may store data gathered by the vehicle sensors 210 and/or data received from the edge server 104. For example, the local database 214 may store attributes of an object to be tracked, received from the edge server 104.

Figure 3:
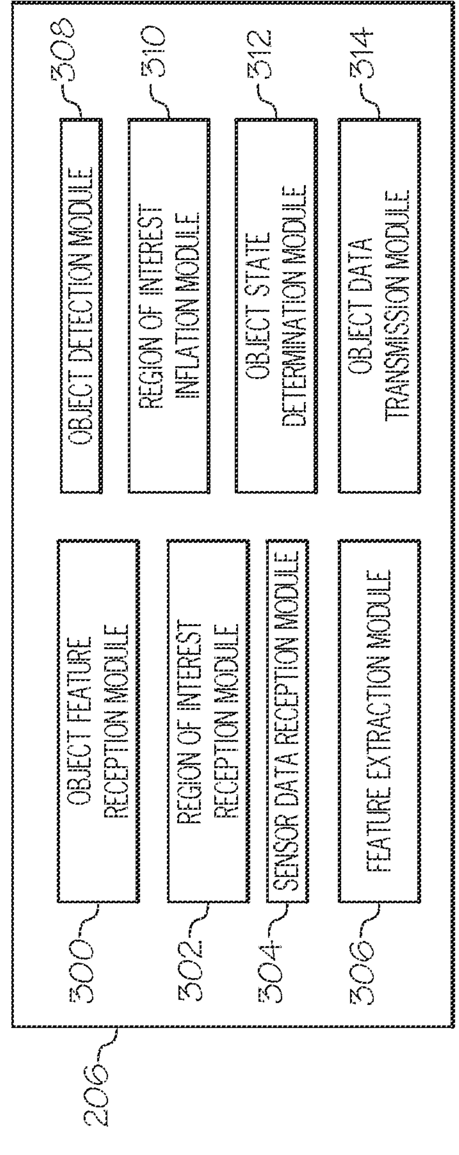
FIG. 3 depicts a schematic diagram of memory modules of the vehicle system of FIG. 2 according to one or more embodiments shown and described herein.

FIG. 3 depicts the memory modules 206 of the vehicle system 200. The memory modules 206 include an object feature reception module 300, a region of interest reception module 302, a sensor data reception module 304, a feature extraction module 306, an object detection module 308, a region of interest inflation module 310, an object state determination module 312, and an object data transmission module 314. Each of the object feature reception module 300, the region of interest reception module 302, the sensor data reception module 304, the feature extraction module 306, the object detection module 308, the region of interest inflation module 310, the object state determination module 312, and the object data transmission module 314 may be a program module in the form of operating systems, application program modules, and other program modules stored in one or more memory modules 404. In some embodiments, the program module may be stored in a remote storage device that may communicate with the mobility operator 102. Such a program module may include, but is not limited to, routines, subroutines, programs, objects, components, data structures and the like for performing specific tasks or executing specific data types as will be described below.

The object feature reception module 300 may receive, from the edge server 104, features associated with an object to be tracked. As discussed above, a customer of the object tracking system 100 may request a particular object to be tracked. The mobility operator 102 may determine features associated with the object to be tracked and transmit the features to an appropriate edge server (e.g., the edge server 104), as discussed in further detail below. After receiving the object features from the mobility operator 102, the edge server 104 may transmit the features to the vehicle 108, and the features may be received by the object feature reception module 300 of the vehicle system 200.

The object features may comprise features associated with the object to be tracked. In the illustrated example, the object features comprise features output by a hidden layer or an output layer of a deep neural network when an image of the object is input to the neural network. However, in other examples, the object features may comprise other features or attributes associated with the object to be tracked. For example, the object features may comprise an image of the object, a hash value of an image of the object, dimensions of the object, and the like.

The region of interest reception module 302 may receive, from the edge server 104, a region of interest where the object is expected to be located. As discussed above, the object tracking system 100 utilizes a plurality of connected vehicles to cooperatively track an object. As the object moves in and out of the field of view of different connected vehicles as the connected vehicles are driven, the edge server 104 may request one or more connected vehicles near the expected position of the object to detect and track the object. However, if a connected vehicle processes sensor data from its entire field of view in order to detect an object, the vehicle may utilize a large amount of computing resources. Accordingly, in order to reduce the computing resources used by the connected vehicle, the edge server 104 may specify a particular region of interest, with respect to a particular connected vehicle, where the object being tracked is expected to be located. This process of determining the region of interest is discussed in further detail below with respect to FIG. 5.

After the edge server 104 identifies a particular region of interest where the object being tracked is expected to be located, the edge server 104 may transmit the region of interest to the appropriate connected vehicle (e.g., the connected vehicle 108 of FIG. 1). The region of interest transmitted by the edge server 104 may be received by the region of interest reception module 302. For example, in FIG. 1, the vehicle 110 being tracked is located in front of and to the left of the vehicle 108. As such, the edge server 104 may specify this region, with respect to the vehicle 108, as the region of interest. For example, the edge server 104 may specify a rectangular area within the field of view of the sensors of the vehicle 108 as the region of interest. In other examples, the region of interest may be specified in other manners. Methods of determining the region of interest are discussed in further detail below. The region of interest reception module 302 may receive the region of interest from the edge server 104 and the vehicle system 200 may utilize the received region of interest to narrow the image processing performed, as disclosed herein.

The sensor data reception module 304 may receive sensor data from one or more of the vehicle sensors 210. The sensor data received by the sensor data reception module 304 may be utilized to track an object, as disclosed herein. In some examples, the sensor data reception module 304 may continually receive sensor data from the vehicle sensors 210 while the vehicle 108 is in operation. In other examples, the sensor data reception module 304 may only start to receive sensor data from the vehicle sensors 210 after the object feature reception module 300 receives features of an object to be tracked in order to reduce power consumption and data usage associated with the vehicle sensors 210. In some examples, the sensor data reception module 304 may only receive sensor data associated with the region of interest received by the region of interest reception module 302 (e.g., a camera may capture an image of the specified region of interest).

The feature extraction module 306 may extract features based on the sensor data received by the sensor data reception module 304. In particular, the feature extraction module 306 may extract features based on the sensor data associated with the region of interest received by the region of interest reception module 302. In the illustrated example, after the object feature reception module 300 receives features of an object to be tracked and the region of interest reception module 302 receives a region of interest where the object is expected to be located, the sensor data reception module 304 may receive an image captured by the vehicle sensors 210 (e.g., an image of the environment surrounding the vehicle 108). The feature extraction module 306 may then extract features based on the captured image, as disclosed herein. However, in other examples, the feature extraction module 306 may extract features from received sensor data in other manners.

In the illustrated example, the feature extraction module 306 may extract features from a captured image using image processing techniques, as disclosed herein. For example, the feature extraction module 306 may input a captured image into a deep neural network trained to identify objects (e.g., a convolutional neural network). The output of one of the hidden layers or an output layer of the neural network may be used as the features extracted by the feature extraction module 306. For example, the feature extraction module 306 may extract features of an image output by a neural network trained using the You Only Look Once (YOLO) object detection algorithm. In other examples, the feature extraction module 306 may utilize other algorithms or other types of neural networks to extract features from a captured image. In the illustrated example, the feature extraction module 306 may only input a portion of a captured image corresponding to the specified region of interest into a deep neural network for feature extraction. This may reduce the computing resources utilized by the feature extraction module 306 as discussed above.

The object detection module 308 may determine whether the object being tracked has been detected based on the captured sensor data. In particular, the object detection module 308 may compare the object features received by the object feature reception module 300 to the features extracted by the feature extraction module 306. If the received object features match the extracted object features within a threshold level of similarity, the object detection module 308 may determine that the object being tracked has been detected. In the illustrated example, the object features received by the object feature reception module 300 and the features extracted by the feature extraction module 306 may be determined using the same method (e.g., based on an output of a neural network trained using the YOLO algorithm). As such, the object features and the extracted features may be directed compared to each other.

The region of interest inflation module 310 may inflate the region of interest if the object detection module 308 does not detect the tracked object in the specified region of interest of the captured image. As discussed above, the region of interest reception module 302 receives a region of interest where the tracked object is expected to be located. However, in some circumstances, the object may be located near, but outside of the region of interest. If this is the case, the object detection module 308 will not detect the object by only considering the region of interest. Accordingly, if the object detection module 308 does not detect the object in the region of interest, the region of interest inflation module 310 may inflate the region of interest and the object detection module 308 may then attempt to detect the object in the larger region of interest. This may be repeated until the object is detected or until the region of interest has been inflated to include the entire captured image. If the object detection module 308 is unable to detect the object in the entire captured image, then the object detection module 308 may determine that the object is not detected. A notification may then be transmitted to the edge server 104 indicating that the object was not detected.

In the illustrated example, the region of interest inflation module 310 may inflate the region of interest by a factory. That is, the region of interest inflation module 310 may increase each dimension of the region of interest uniformly by the factor γ. The factor γ may be specified by a user. In other examples, the region of interest inflation module 310 may utilize other techniques to inflate the region of interest.

The object state determination module 312 may determine a state of the object after it has been detected by the object detection module 308. In the illustrated example, the object state may comprise data associated with the object including the location of the object, the speed of the object, and the trajectory of the object. However, in other examples, the object state may comprise other data or parameters associated with the object. The object state determination module 312 may determine the data of the object state based on the sensor data received by the sensor data reception module 304. In some examples, the object state determination module 312 may utilize sensor data captured at multiple time steps to determine certain parameters of the object state (e.g., speed and trajectory).

In some examples, the object state determination module 312 may determine an uncertainty level associated with the object state. For example, the data collected by the sensor data reception module 304 may be noisy due to measurement uncertainty, shading of the object, variable lighting conditions of the object, obstructions between the vehicle 108 and the object, and other factors. As such, the object state determination module 312 may determine an uncertainty level indicating an amount of uncertainty in the object parameters determined by the object state determination module 312 based on the sensor data received by the sensor data reception module 304. In some examples, the object state determination module 312 may determine multiple uncertainty levels associated with different object parameters (e.g., position, speed, trajectory).

The object data transmission module 314 may transmit data associated with the object state to the edge server 104. In some examples, the object data transmission module 314 may also transmit one or more uncertainty levels associated with the determined object parameters. The edge server 104 may utilize this data to update and maintain a track of the object, as disclosed in further detail below.

Figure 4:
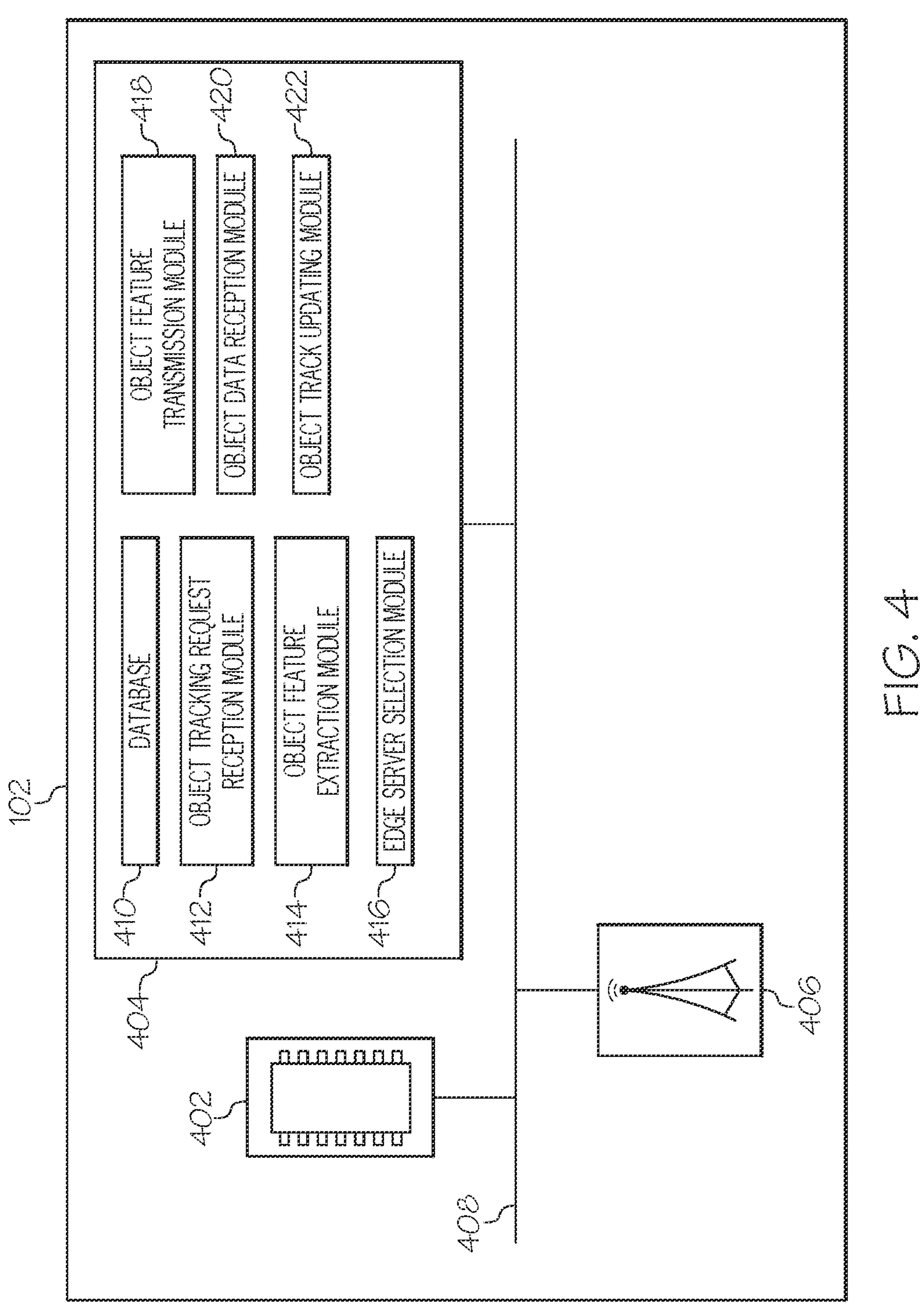
FIG. 4 depicts a mobility operator of the object tracking system of FIG. 1, according to one or more embodiments shown and described herein.

Now referring to FIG. 4, the mobility operator 102 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 406 of the mobility operator 102 may transmit and receive data to and from edge servers (e.g., the edge servers 104, 106 of FIG. 1).

The one or more memory modules 404 include a database 410, an object tracking request reception module 412, an object feature extraction module 414, an edge server selection module 416, an object feature transmission module 418, an object data reception module 420, and an object track updating module 422. Each of the database 410, the object tracking request reception module 412, the object feature extraction module 414, the edge server selection module 416, the object feature transmission module 418, the object data reception module 420, and the object track updating module 422 may be a program module in the form of operating systems, application program modules, and other program modules stored in one or more memory modules 404. In some embodiments, the program module may be stored in a remote storage device that may communicate with the mobility operator 102. Such a program module may include, but is not limited to, routines, subroutines, programs, objects, components, data structures and the like for performing specific tasks or executing specific data types as will be described below.

The database 410 may store data utilized by the mobility operator 102. In embodiments, the database 410 may store data associated with objects to be tracked. This data may include object tracks, as disclosed in further detail herein. The database 410 may also store data received by edge servers (e.g., the edge servers 104, 106 of FIG. 1). The database 410 may also store location information of each of the edge servers that are part of the object tracking system 100 (e.g., locations of the edge servers 104, 106 of FIG. 1).

The object tracking request reception module 412 may receive a request to track an object. As discussed above, customers of the object tracking system 100 may request one or more objects to be tracked. Such requests may be received by the object tracking request reception module 412. In particular, the object tracking request reception module 412 may include data or attributes associated with an object to be tracked. In the illustrated example, the object tracking request reception module 412 may receive an image of an object to be tracked. However, in other examples, the object tracking request reception module 412 may receive other data or attributes associated with an image to be tracked. In the illustrated example, the object tracking request reception module 412 may also receive an estimated position of an object to be tracked.

The object feature extraction module 414 may extract features associated with an object to be tracked based on data received by the object tracking request reception module 412. In the illustrated example, the object feature extraction module 414 may input an image of an object to be tracked into a trained neural network (e.g., a convolutional neural network). An output of a hidden layer or an output layer of the neural network may be extracted by the object feature extraction module 414 as object features. However, in other examples, the feature extraction module 306 may extract object features in any other manner. In embodiments, the object feature extraction module 414 may extract features of an image in the same manner as the feature extraction module 306 of the vehicle system 200 (e.g., using the YOLO algorithm) such that features can be directly compared against each other.

The edge server selection module 416 may select an edge server to track the requested object. As discussed above, the database 410 may store a location of each edge server that is part of the object tracking system 100. Thus, the edge server selection module 416 may select one of the edge servers that is part of the object tracking system 100 to track the object. In the illustrated example, the edge server selection module 416 may select the edge server whose location is closest to the estimated position of the object received by the object tracking request reception module 412. This is the edge server most likely to be within range of connected vehicles that can detect the object. However, in other examples, the edge server selection module 416 may select an edge server to track the object in a different manner. If the object being tracked is expected to move from the coverage area of one edge server to the coverage area of another edge server (e.g., as the vehicle 110 of FIG. 1 moves from the coverage area of the edge server 104 to the coverage area of the edge server 106), the edge server selection module 416 may select the edge server whose coverage area the object is moving into to track the area. As such, tracking of the object by different edge servers can continue uninterrupted as the object moves between the coverage areas of different edge servers.

The object feature transmission module 418 may transmit the object features determined by the object feature extraction module 414 to the edge server selected by the edge server selection module 416. This may cause the selected edge server to begin tracking the object, as discussed in further detail below. In particular, the selected edge server may cause various connected vehicles to track the object based on the received object features, as disclosed herein.

The object data reception module 420 may receive object data associated with the object being tracked from one or more edge servers. In particular, as the object is tracked by one or more edge servers, the edge servers may transmit object data including an updated location, speed, and trajectory of the object to the mobility operator 102. In other examples, the edge servers may transmit additional data about the tracked object to the mobility operator 102. The object data transmitted by the edge servers may be received by the object data reception module 420.

The object track updating module 422 may update a track of the object being tracked. In embodiments, the track of the object may comprise a record of past object locations of the tracked object. In some examples, the track may also include an estimated future location of the tracked object. In some examples, the object track may also include a record of the speed, trajectory, and/or other attributes of the tracked object. As discussed above, the object data reception module 420 may periodically receive updates about the position and/or other data associated with the object being tracked. Thus, the object track updating module 422 may update the track of the object as this data is received. Accordingly, the mobility operator 102 may maintain a record of the position of the tracked object at various time steps. This track data may be stored in the database 410. The track data may be accessible to the customer that requested the object to be tracked. For example, the customer may be able to access the track data by accessing a customer portal, or the track data may be transmitted to the customer.

Figure 5:
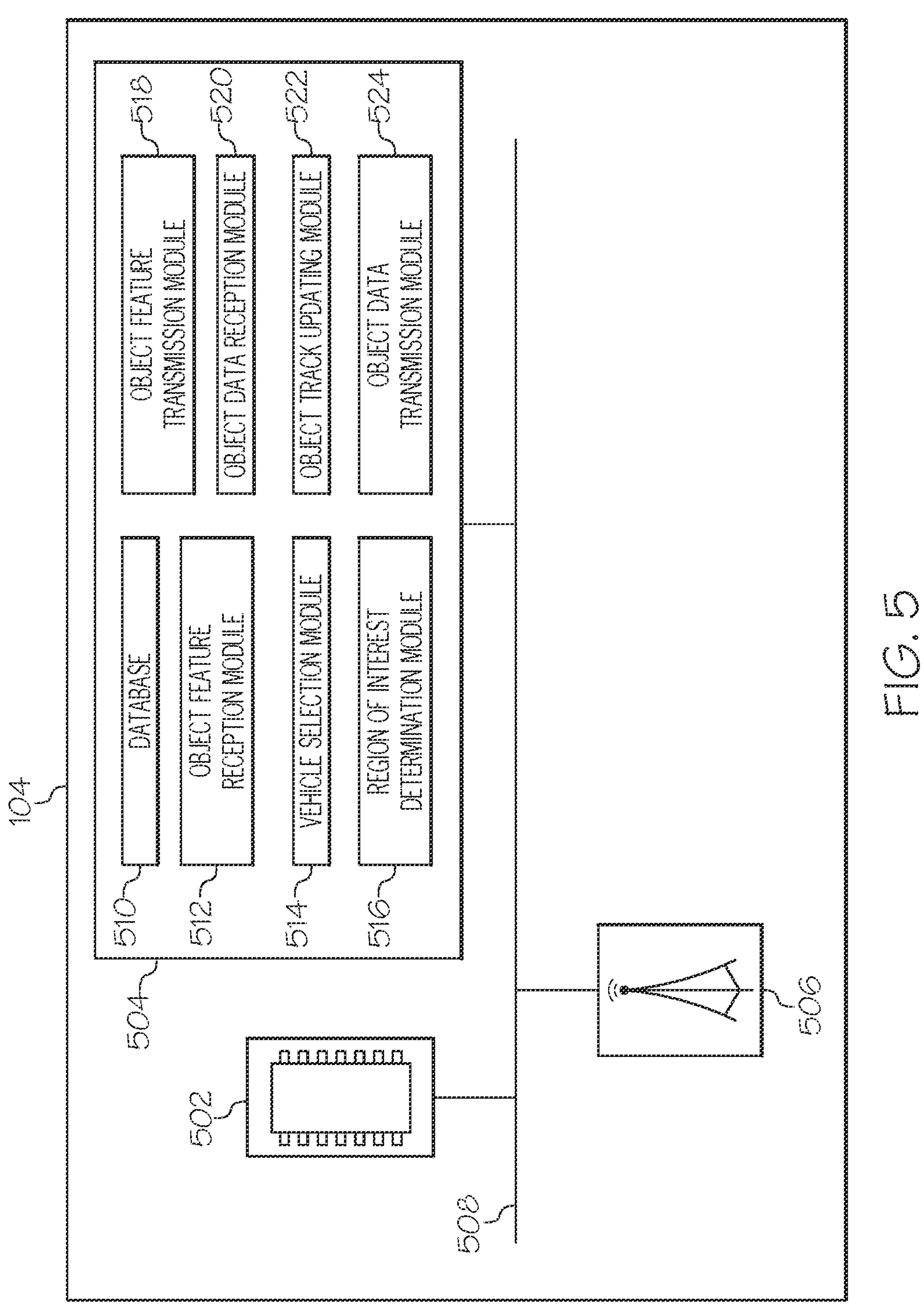
FIG. 5 depicts an edge server of the object tracking system of FIG. 1, according to one or more embodiments shown and described herein.

Now referring to FIG. 5, the edge server 104 comprises one or more processors 502, one or more memory modules 504, network interface hardware 506, and a communication path 508. While FIG. 5 schematically illustrates the edge server 104 of FIG. 1, it should be understood that the edge server 106 or other edge servers of the object tracking system 100 may be constructed in a similar manner.

Referring to FIG. 5, the one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 506 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 506 of the edge server 104 may transmit and receive data to and from the mobility operator 102 and/or connected vehicles (e.g., the connected vehicle 108 of FIG. 1).

The one or more memory modules 504 include a database 510, an object feature reception module 512, a vehicle selection module 514, a region of interest determination module 516, an object feature transmission module 518, an object data reception module 520, an object track updating module 522, and an object data transmission module 524. Each of the database 510, the object feature reception module 512, the vehicle selection module 514, the region of interest determination module 516, the object feature transmission module 518, the object data reception module 520, the object track updating module 522, and the object data transmission module 524 may be a program module in the form of operating systems, application program modules, and other program modules stored in one or more memory modules 504. In some embodiments, the program module may be stored in a remote storage device that may communicate with the edge server 104. Such a program module may include, but is not limited to, routines, subroutines, programs, objects, components, data structures and the like for performing specific tasks or executing specific data types as will be described below.

The database 510 may store data utilized by the edge server 104. In particular, the database 510 may store data received from the mobility operator 102 and/or connected vehicles (e.g., the connected vehicle 108 of FIG. 1). The database 510 may also store object tracks associated with one or more objects being tracked by the edge server 104, as disclosed herein. As discussed above, an object track may comprise a current location of a tracked object and a record of past locations of the tracked object. In some examples, the object track may comprise an estimated future location of the tracked object.

The object feature reception module 512 may receive features of object to be tracked from the mobility operator 102. As discussed above, in some examples, object features comprise an output of a neural network after inputting an image of the tracked object into the neural network. In other examples, the object features may comprise other data associated with the tracked object. The object features received by the object feature reception module 512 may be utilized to track objects, as disclosed herein. In some examples, the object feature reception module 512 may also receive an expected location of the object being tracked.

The vehicle selection module 514 may select a vehicle to track a specified object. As discussed above, the object tracking system 100 may utilize a plurality of connected vehicles to cooperatively monitor a tracked object. As such, when a connected vehicle that is part of the object tracking system 100 is within range of a particular edge server (e.g., the edge servers 104, 106 of FIG. 1), the connected vehicle may connect to the edge server and share its location with the edge server. Accordingly, the edge servers of the object tracking system 100 may monitor the locations of connected vehicles within each of their coverage areas.

When the object feature reception module 512 receives object features and an expected location of an object to be tracked, the vehicle selection module 514 may identify a vehicle within the coverage area of the edge server 104 that is within line of sight of the expected location of the tracked object. As such, the selected vehicle may track the object using vehicle sensors while the object is within line of sight of the vehicle, as discussed above. In some examples, if multiple vehicles are within line of sight of the expected location of the object being tracked, the vehicle selection module 514 may select the connected vehicle located closest to the expected location of the object. In other examples, if multiple vehicles are within line of sight of the expected location of the object being tracked, the vehicle selection module 514 may select each such vehicle to track the object. In these examples, the edge server 104 may receive data from multiple connected vehicles tracking an object simultaneously.

After initially selecting a connected vehicle to track the object based on the estimated location of the object, the edge server may begin to receive data associated with the tracked object indicating its location as detected by connected vehicles, as disclosed herein. As this data is received, the edge server 104 may continually update the position of the tracked object as well as an estimated future position of the object. As the object moves out of the line of sight of one connected vehicle, the vehicle selection module 514 may select another connected vehicle to continue to track the object based on the estimated future position of the object. As such, the vehicle selection module 514 may continually select connected vehicles within the coverage area of the edge server 104 to monitor the object based on the movement of the object and the connected vehicles.

The region of interest determination module 516 may determine a region of interest associated with the vehicle selected by the vehicle selection module 514. In particular, the region of interest determination module 516 may determine a region of interest from the point of view of the selected vehicle within which the tracked object is expected to be located. As discussed above, the edge server 104 may track the location of the object being tracked based on an initial estimated position received by the object feature reception module 512 and subsequent data received from connected vehicles. Accordingly, the region of interest determination module 516 may determine a region of interest based on a known location of a selected connected vehicle and an estimated position of the tracked object, as disclosed herein.

Figure 6:
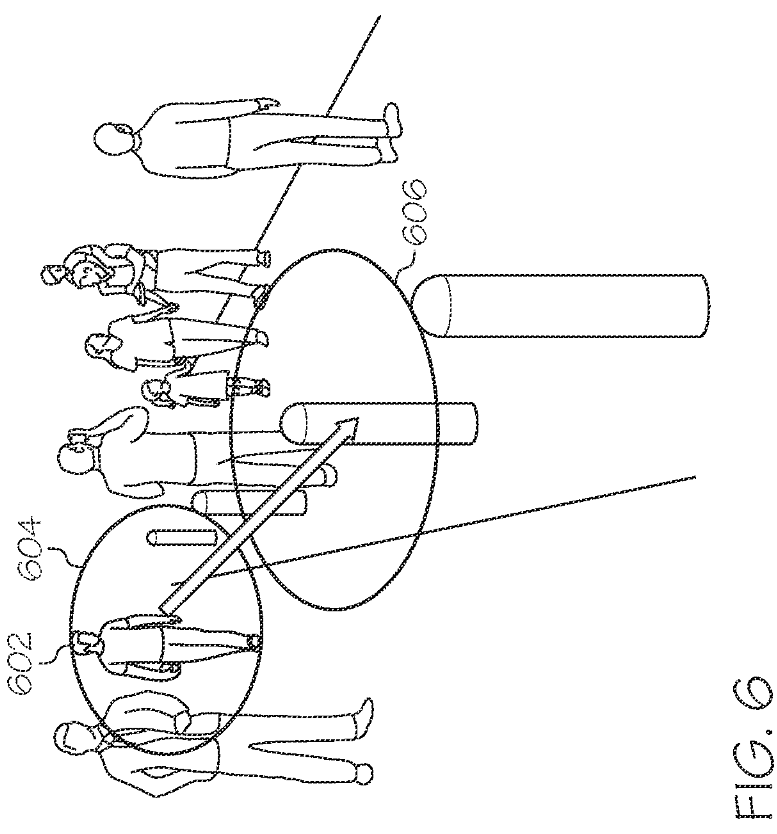
FIG. 6 depicts an example image that may be captured by the vehicle system of FIG. 2, according to one or more embodiments shown and described herein.
Figure 6:
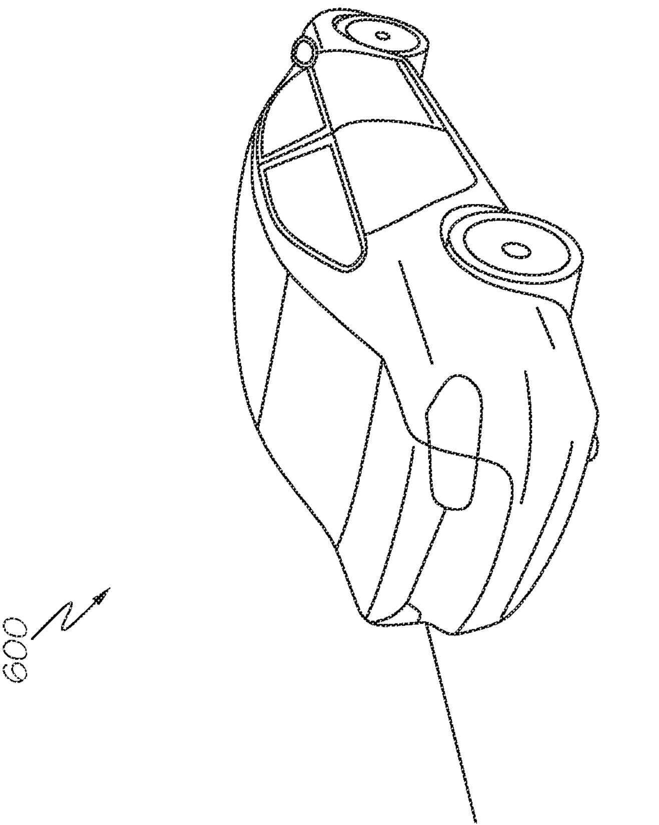

FIG. 6 shows an image 600 that may be captured by the vehicle sensors 210 of the connected vehicle 108. In the example of FIG. 6, the person 602 shown in the image 600 is the object being tracked by the object tracking system 100. As discussed above, the vehicle 108 may detect the position of the person 602 based on captured sensor data. The vehicle 108 may also determine the speed and trajectory of the person 602 based on the captured sensor data. In the example of FIG. 6, oval 604 represents the current position of the person 602 at time ti and oval 606 represents an expected future position of the person 602 at time $t_{k+1}$.

Figure 7:
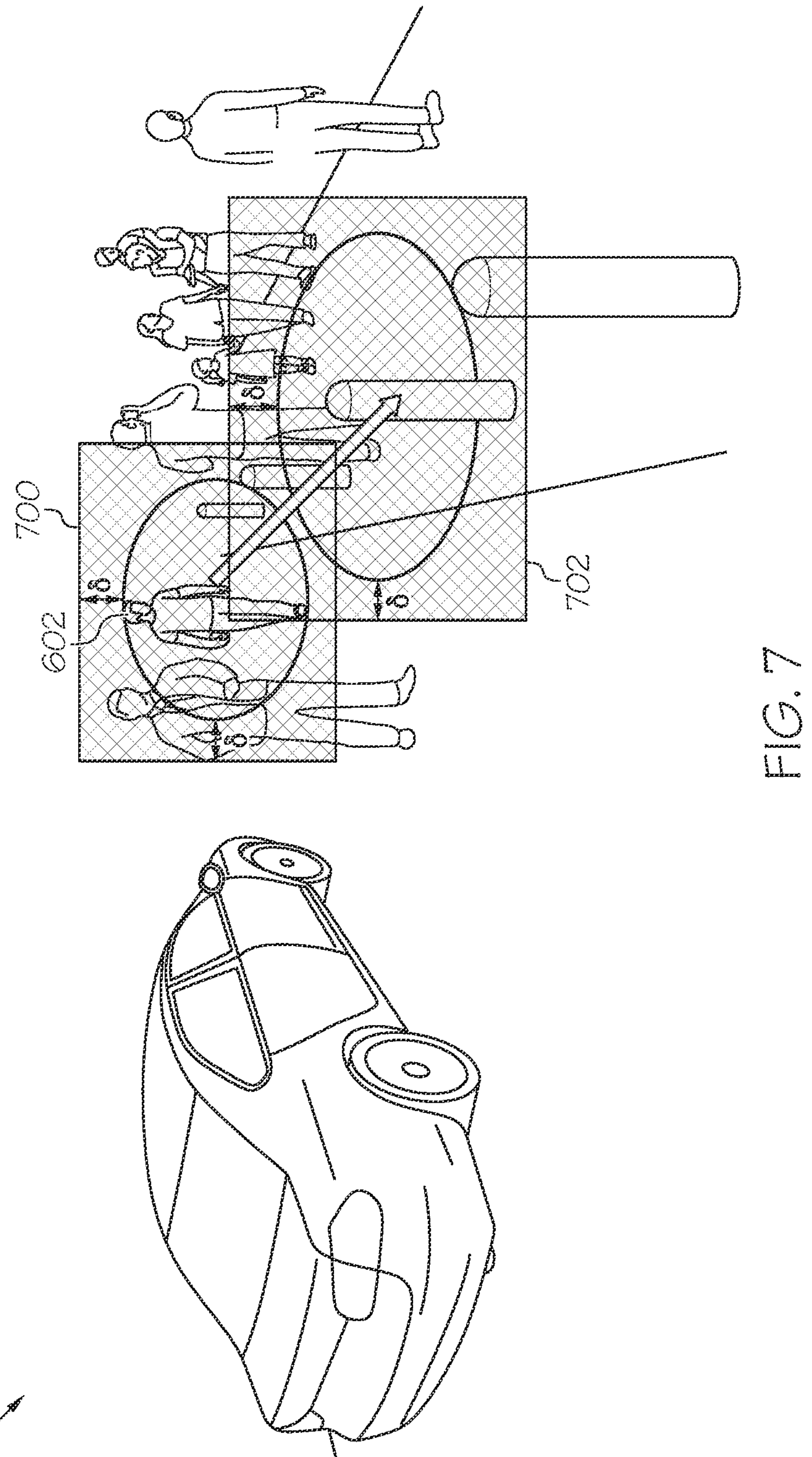
FIG. 7 depicts example bounding boxes associated with the image of FIG. 6, according to one or more embodiments shown and described herein.

In embodiments, the region of interest determination module 516 may determine bounding boxes associated with the current and predicted future locations of the person 602, as shown in FIG. 7. In the example of FIG. 7, a bounding box 700 represents a current position of the person 602 and a bounding box 702 represents a predicted future position of the person 602 that may be determined by the region of interest determination module 516. In embodiments, the size and shape of the bounding boxes determined by the region of interest determination module 516 may be based on the size and shape of the object being tracked. In some examples, the size of the bounding boxes determined by the region of interest determination module 516 may be based at least in part on the uncertainty level associated with the object state.

In some examples, the size and shape of the bounding boxes determined by the region of interest determination module 516 may be based at least in part on a covariance between a current location of the tracked object and a predicted future location of the tracked object. The covariance may be determined based on the uncertainty levels associated with the object state received by the edge server 104. In some examples, the covariance may be projected onto the image plane to obtain a width and a height, which may be inflated by a parameter 6 to determine the size of the bounding boxes, as shown in FIG. 7. The parameter S may be specified by a user.

In the illustrated example, the region of interest determination module 516 may determine a region of interest as a rectangle comprising the union between the bounding box associated with the current location of the tracked object and the bounding box associated with the predicted future location of the tracked object. For example, FIG. 8 shows a region of interest 800 comprising a rectangle that encapsulates the union of bounding boxes 700 and 702 that may be determined by the region of interest determination module 516.

Referring back to FIG. 5, the object feature transmission module 518 may transmit object features received by the object feature reception module 512 and the region of interest determined by the region of interest determination module 516 to the connected vehicle selected by the vehicle selection module 514. This may allow the selected vehicle to track the object as disclosed herein.

The object data reception module 520 may receive object data transmitted by connected vehicles (e.g., the vehicle 108 of FIG. 1). This data may include a position, speed, and trajectory, as well as any other data determined by the vehicle system 200 of any connected vehicles tracking the object. As different connected vehicles are selected by the vehicle selection module 514, the object data reception module 520 may continually receive object data from different connected vehicles. The data received from the connected vehicles may be used to update the object track, as disclosed herein.

The object track updating module 522 may update and maintain an object associated with the object being tracked. As discussed above, the object track may comprise a record of past positions, speeds, and trajectories of a tracked object. As such, as object data is received by the object data reception module 520, the object track updating module 522 may continually update the track associated with the tracked object.

The object data transmission module 524 may transmit, to the mobility operator 102, object data received by the object data reception module 520. Accordingly, the edge server 104 may maintain tracks of objects within the coverage area of the edge server 104, and the mobility operator 102 may maintain tracks of objects within the coverage area of any edge server that is part of the object tracking system 100.

Figure 9:
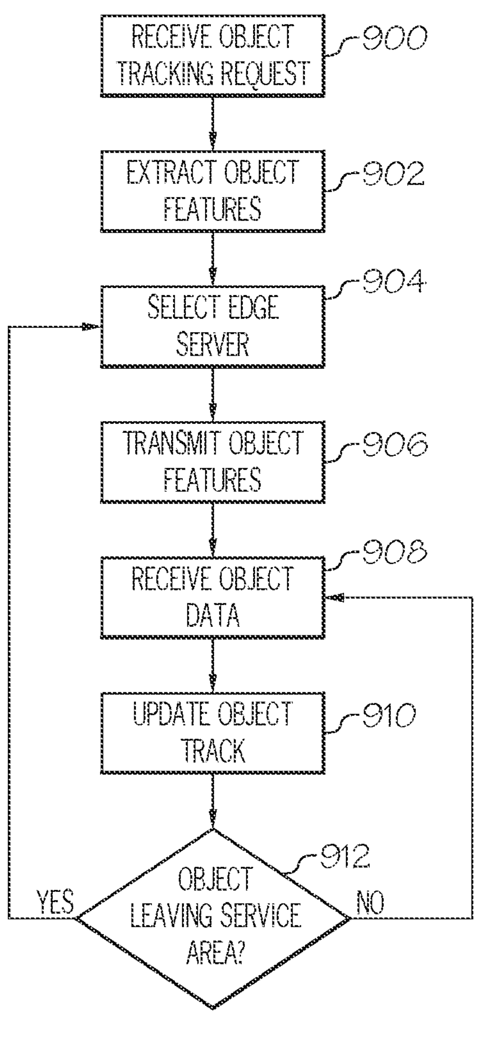
FIG. 9 depicts a flowchart of an example method of operating the mobility operator of FIGS. 1 and 4, according to one or more embodiments shown and described herein.

FIG. 9 depicts a flowchart of an example method that may be performed by the mobility operator 102 of the object tracking system 100. At step 900, the object tracking request reception module 412 receives an object tracking request. The object tracking request may indicate an object that a customer requests to be tracked by the object tracking system 100. The request may indicate attributes of the object to be tracked. In the illustrated example, the request includes an image of the object to be tracked. However, in other examples, the request may include other attributes of the object to be tracked. In the illustrated example, the object tracking request may also include an estimated location of the object to be tracked.

At step 902, the object feature extraction module 414 extracts object features of the object to be tracked. In the illustrated example, the object feature extraction module 414 inputs an image of the object to be tracked into a trained neural network and uses an output of the neural network as the object features. However, in other examples, the object feature extraction module 414 may extract object features using other techniques.

At step 904, the edge server selection module 416 selects an edge server to track the object. In the illustrated example, the edge server selection module 416 selects an edge server having a coverage area that includes the estimated location of the object, based on the known locations of the edge servers that are part of the object tracking system 100 stored in the database 410. If the estimated location of the object is within the coverage areas of multiple edge servers, the edge server selection module 416 may select the edge server whose location is closest to the estimated location of the object.

At step 906, the object feature transmission module 418 transmits object features determined by the object feature extraction module 414 to the edge server selected by the edge server selection module 416. In the illustrated example, the object feature transmission module 418 also transmits the estimated location of the object.

At step 908, the object data reception module 420 receives object data from the edge server selected by the edge server selection module 416. The object data may include a position of the object, a speed of the object, and a trajectory of the object.

At step 910, the object track updating module 422 updates an object track associated with the object based on the object data received by the object data reception module 420. The object track may include a record of the current and past states of the object (e.g., positions, speeds, and trajectories). The object track may also include an estimated future state of the object based on the current position, speed, and trajectory of the object.

At step 912, the object track updating module 422 determines whether the object is expected to leave the coverage area of the edge server selected by the edge server selection module 416. The object track updating module 422 may make this determination based on the object track, the current state of the object, and an estimated future state of the object. For example, if the object is located at the eastern-most part of the coverage area of the edge server and the object is heading east, the object track updating module 422 may determine that the object is likely to exit the coverage area of the edge server at a future time step.

If the object track updating module 422 determines that the object is expected to leave the coverage area of the edge server selected by the edge server selection module 416 (YES at step 912), then control returns to step 904 and the edge server selection module 416 selects another edge server to continue to track the object based on the expected future location of the object. That is, the edge server selection module 416 may select an edge server having a coverage area that includes the expected future location of the object. Alternatively, if the object track updating module 422 determines that the object is not expected to leave the coverage area of the edge server selected by the edge server selection module 416 (NO at step 912), then control returns to step 908, and the object data reception module 420 continues to receive object data from the previously selected edge server.

Figure 10:
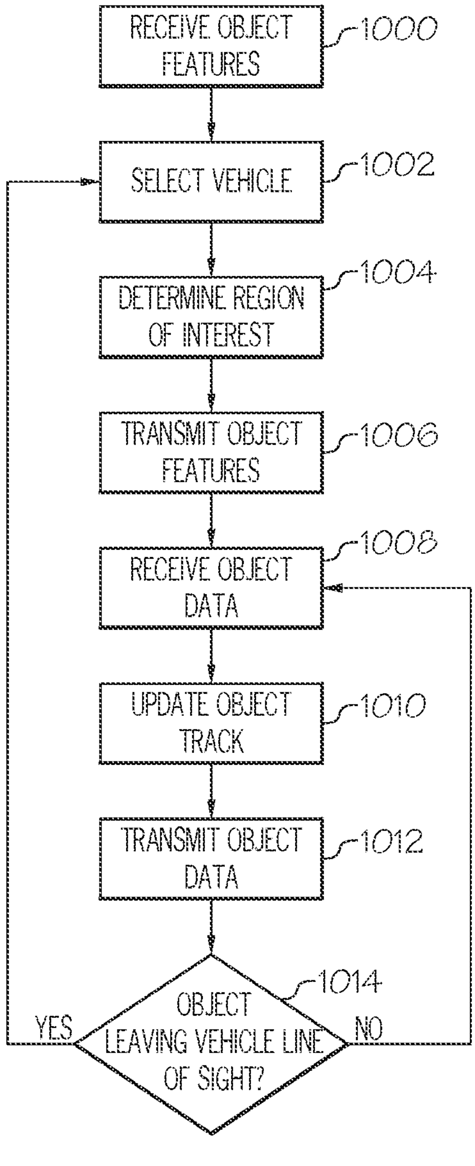
FIG. 10 depicts a flowchart of an example method of operating the edge server of FIGS. 1 and 5, according to one or more embodiments shown and described herein.

FIG. 10 depicts a flowchart of an example method that may be performed by the edge server 104 of the object tracking system 100. At step 1000, the object feature reception module 512 receives object features from the mobility operator 102 associated with an object being tracked by the object tracking system 100. In the illustrated example, the object features received by the object feature reception module 512 may comprise an output of a neural network after an image of the object has been input into the neural network by the mobility operator 102. In the illustrated example, the object feature reception module 512 also receives an estimated location of the object from the mobility operator 102.

At step 1002, the vehicle selection module 514 selects a vehicle to track the object based on the estimated location of the object and the locations of connected vehicles within the coverage area of the edge server 104. In the illustrated example, the vehicle selection module 514 may select a connected vehicle for which the estimated location of the object is within a line of sight. In the illustrated example, if there are multiple vehicles within a line of sight of the object, the vehicle selection module 514 may select the vehicle closest to the estimated location of the object.

At step 1004, the region of interest determination module 516 determines a region of interest associated with the vehicle selected by the vehicle selection module 514 within which the object is expected to be located based on the estimated location of the object. The region of interest determination module 516 may determine the region of interest using the techniques described above.

At step 1006, the object feature transmission module 518 transmits the object features received by the object feature reception module 512 to the vehicle selected by the vehicle selection module 514. The object feature transmission module 518 also transmits the region of interest determined by the region of interest determination module 516 to the vehicle selected by the vehicle selection module 514.

At step 1008, the object data reception module 520 receives object data from the connected vehicle selected by the vehicle selection module 514. The object data may include a position, speed, and trajectory of the object being tracked.

At step 1010, the object track updating module 522 updates an object track associated with the object being tracked based on the data received by the object data reception module 520. The object track may include a record of current and past states of the object (e.g., locations, speeds, trajectories). The object track may also include a predicted future state of the object based on current and past states of the object.

At step 1012, the object data transmission module 52 transmits the object data received by the object data reception module 520 to the mobility operator 102.

At step 1014, the object track updating module 522 determines whether the object is expected to leave the line of sight of the vehicle selected by the vehicle selection module 514. The object track updating module 522 may make this determination based on the object track, the current state of the object, and an estimated future state of the object. For example, if the object is located at the eastern-most part of the field of view of the connected vehicle and the object is heading east, the object track updating module 522 may determine that the object is likely to leave the line of sight of the connected vehicle at a future time step.

If the object track updating module 522 determines that the object is expected to leave the line of sight of the connected vehicle selected by the vehicle selection module 514 (YES at step 1014), then control returns to step 1002 and the vehicle selection module 514 selects another vehicle to continue to track the object based on the expected future location of the object. That is, the vehicle selection module 514 may select a vehicle having a line of sight of the expected future location of the object. Alternatively, if the object track updating module 522 determines that the object is not expected to leave the line of sight of the vehicle server selected by the vehicle selection module 514 (NO at step 1014), then control returns to step 1008, and the object data reception module 520 continues to receive object data from the previously selected vehicle.

Figure 11:
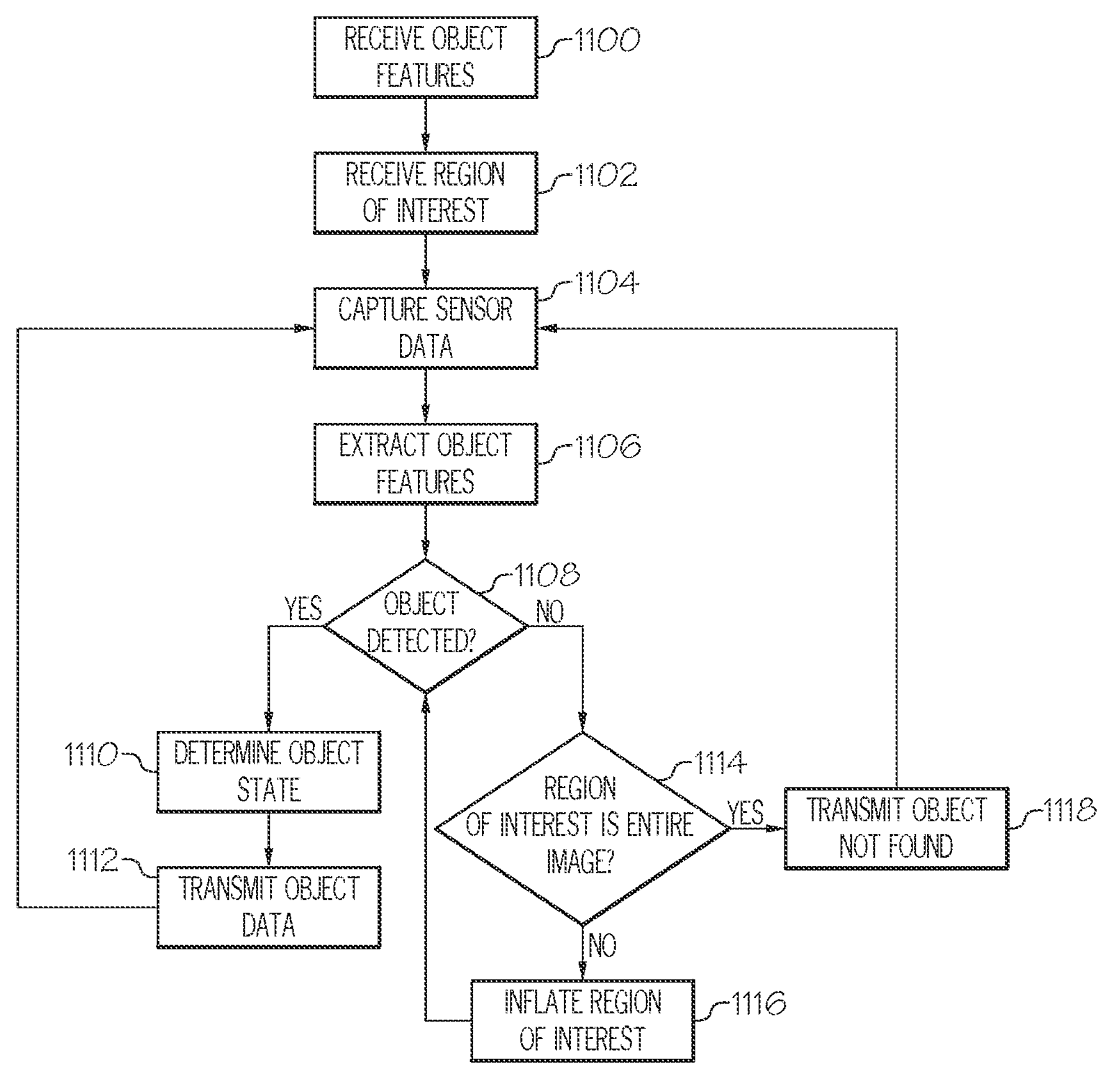
FIG. 11 depicts a flowchart of an example method of operating the vehicle system of FIG. 2, according to one or more embodiments shown and described herein.

FIG. 11 depicts a flowchart of an example method that may be performed by the connected vehicle 108 of the object tracking system 100. At step 1100, the object feature reception module 300 receives object features from the edge server 104. At step 1102, the region of interest reception module 302 receives a region of interest from the edge server 104.

At step 1104, the sensor data reception module 304 receives sensor data captured by the vehicle sensors 210. In the illustrated example, the sensor data reception module 304 receives an image captured by a camera. However, in other examples, the sensor data reception module 304 may capture other types of sensor data.

At step 1106, the feature extraction module 306 extracts features from a portion of the captured image corresponding to the region of interest received by the region of interest reception module 302. In the illustrated example, the feature extraction module 306 may input the captured image into a trained neural network and the output of the neural network may comprise the extracted features. However, in other examples, the feature extraction module 306 may extract features in other manners.

At step 1108, the object detection module 308 determines whether the object being tracked is detected within the region of interest received by the region of interest reception module 302. In the illustrated example, the object detection module 308 may detect the object by comparing the features received by the object feature reception module 300 to the features extracted by the feature extraction module 306. If the features received by the object feature reception module 300 match the features extracted by the feature extraction module 306 within a threshold level of similarity, the object detection module 308 may determine that the object is detected.

If the object detection module 308 detects the object within the region of interest received by the region of interest reception module 302 (YES at step 1108), then at step 1110, the object state determination module 312 determines an object state of the object being tracked. In the illustrated example, the object state comprises a location, speed, and trajectory of the object.

At step 1112, the object data transmission module 314 transmits data comprising the object state determined by the object state determination module 312 to the edge server 104. Control then returns to step 1104, and the sensor data reception module 304 receives additional sensor data captured by the vehicle sensors 210, thereby allowing the object to be continually tracked by the vehicle 108.

If the object detection module 308 does not detect the object within the region of interest received by the region of interest reception module 302 (NO at step 1108), then at step 1114, the region of interest inflation module 310 determines whether the current region of interest comprises the entire image received by the sensor data reception module 304. If the current region of interest does not comprise the entire image (NO at step 1114), then at step 1116, the region of interest inflation module 310 inflates the region of interest using the techniques disclosed above. Control then returns to step 1108, and the object detection module 308 determines whether the object is detected in the inflated region of interest.

Alternatively, if the region of interest inflation module 310 determines that the current region of interest comprises the entire image received by the sensor data reception module 304, then at step 1118, the object data transmission module 314 transmits a notification to the edge server 104 indicating that the object cannot be detected by the vehicle 108. Control then returns to step 1104, and the sensor data reception module 304 receives additional sensor data captured by the vehicle sensors 210.

It should not be understood that embodiments described herein are directed to systems and methods for efficient object tracking as a serviced via edge. An object tracking system may comprise a mobility operator, a plurality of edge servers, and a plurality of connected vehicles. Each edge server may cover a different coverage area. The mobility operator may receive a request to track an object and may task a particular edge server with tracking the object based on an estimated location of the object. As the object moves between coverage areas of different edge servers, tracking of the object may occur by each edge server when the object is within its particular coverage area, as managed by the mobility operator.

An edge server may track an object by selecting a connected vehicle that is near the estimated location of the object and transmitting object features to the selected vehicle. In addition, the edge server may determine a region of interest with respect to the selected vehicle where the object is expected to be located. The connected vehicle may then capture an image and perform image processing of the region of interest to detect the object. By only performing image processing on the region of interest, the computational resources used by the vehicle may be minimized. Furthermore, by utilizing the capabilities of the vehicle to perform the image processing, the computational resources of the edge server may be minimized.

When the vehicle detects the object, the vehicle may determine object data about the object and transmit the object data to the edge server. The edge server may update an object track and transmit the object data to the mobility operator, which may also update an object track of the object. The object track maintained by the mobility operator may be accessible to the customer that requested tracking of the object. As such, the systems and methods disclosed herein may allow for efficient object tracking.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

receiving features associated with an object to be tracked, wherein the features comprise an output of a neural network after an image of the object is input to the neural network:

receiving an estimated location of the object;

determining a region of interest by specifying a rectangular area within a field of view of one or more sensors of a first connected vehicle as the region of interest that includes the estimated location of the object;

transmitting the features and the region of interest to the first connected vehicle;

receiving object data associated with the object from the first connected vehicle, the object data comprising a location of the object as determined by the first connected vehicle; and updating an object track associated with the object based on the object data, the object track comprising the location of the object at a plurality of time steps.

2. The method of claim 1, wherein the object data further includes a speed and trajectory of the object.

3. The method of claim 1, further comprising:

selecting the first connected vehicle from among a plurality of connected vehicles based on locations of the plurality of connected vehicles and the estimated location of the object.

4. The method of claim 3, further comprising:

selecting the first connected vehicle from among the plurality of connected vehicles having a location closest to the estimated location of the object.

5. The method of claim 1, further comprising:

determining an estimated future location of the object based on the object data;

determining whether the estimated future location of the object is within a line of sight of the first connected vehicle; and upon determination that the estimated future location of the object is not within the line of sight of the first connected vehicle, transmitting the features to a second connected vehicle, the estimated future location of the object being within a line of sight of the second connected vehicle.

6. The method of claim 1, further comprising:

determining an estimated future location of the object based on the object data;

determining a covariance between the estimated location of the object and the estimated future location of the object; and determining a size and a shape of the region of interest based on the covariance.

* * * * *